United States Patent

Shiraki et al.

[11] Patent Number: 6,007,760
[45] Date of Patent: Dec. 28, 1999

[54] METHOD OF PRODUCING INFLATION FILM, APPARATUS THEREFOR AND MOLDED ARTICLES THEREOF

[75] Inventors: Takeshi Shiraki; Iwatoshi Suzuki, both of Yamaguchi-ken, Japan

[73] Assignee: Mitsui Chemicals, Inc., Tokyo, Japan

[21] Appl. No.: 08/742,999

[22] Filed: Nov. 1, 1996

[30] Foreign Application Priority Data

Nov. 1, 1995 [JP] Japan .................................. 7-285216
Sep. 9, 1996 [JP] Japan .................................. 8-237865

[51] Int. Cl.⁶ ............................. B29C 47/20; B29C 47/50
[52] U.S. Cl. .................. 264/503; 264/209.2; 264/565; 425/326.1; 425/381
[58] Field of Search ........................... 264/503, 564–566, 264/209.2; 525/240; 425/381, 326.1; 526/352

[56] References Cited

U.S. PATENT DOCUMENTS

| | | | |
|---|---|---|---|
| 3,244,781 | 4/1966 | Covington, Jr. et al. | 264/209.2 |
| 3,276,075 | 10/1966 | Harwood | 425/381 |
| 3,387,331 | 6/1968 | Billings | 264/209.2 |
| 3,879,158 | 4/1975 | Enrique . | |
| 4,021,170 | 5/1977 | Andersen et al. | 425/381 |
| 4,358,330 | 11/1982 | Aronovici | 264/503 |
| 4,798,696 | 1/1989 | Per | 264/209.2 |
| 4,938,908 | 7/1990 | Shiraki et al. | 264/209.2 |
| 4,946,371 | 8/1990 | Shiraki et al. | 264/209.2 |
| 5,290,498 | 3/1994 | Shiraki et al. | 264/565 |
| 5,332,379 | 7/1994 | Baumgarten | 425/382.3 |
| 5,417,561 | 5/1995 | Shiraki et al. | 425/382.3 |

FOREIGN PATENT DOCUMENTS

| | | |
|---|---|---|
| 0213807 | 3/1987 | European Pat. Off. . |
| 1927733 | 2/1971 | Germany . |
| 51-20227 | 6/1976 | Japan .................................. 425/381 |
| 54-113656 | 9/1979 | Japan .................................. 264/209.2 |
| 62-104911 | 5/1987 | Japan .................................. 264/209.2 |
| 490957 | 5/1970 | Switzerland . |

*Primary Examiner*—Jan H. Silbaugh
*Assistant Examiner*—Mark Eashoo
*Attorney, Agent, or Firm*—Sherman and Shalloway

[57] ABSTRACT

A method of producing an inflation film which includes the steps of melting an ultra-high-molecular-weight polyolefin in an extruder, extruding the molten polyolefin from a screw die, and blowing a gas into a molten tubular film formed by extrusion. An apparatus for producing an inflation film which includes an extruder provided with a first screw, and a screw die having an L/D of at least 5 and is provided at the end of the extruder, wherein the screw die includes a second screw which rotates independently of the first screw, a mandrel coupled to the end of the second screw and rotates together with the second screw, an outer tube die in which the mandrel is inserted, and a gas passage extending in the second screw and in the mandrel. An inflation film is composed of an ultra-high-molecular-weight polyolefin having a tensile strength at break of greater than 1660 kg/cm² in a machine direction and greater than 1600 kg/cm² in a transverse direction, an impact strength of greater than 9500 kg·cm/cm, a thickness of from 10 to 1000 μm, an R-value of not larger than 10 μm and an intrinsic viscosity (η) of at least 7 dl/g.

11 Claims, 1 Drawing Sheet

METHOD OF PRODUCING INFLATION FILM, APPARATUS THEREFOR AND MOLDED ARTICLES THEREOF

BACKGROUND OF THE INVENTION

1. Field of the Invention

The present invention relates to a method of producing an inflation film, an apparatus therefor, and an inflation film obtained thereby. More specifically, the invention relates to a method of producing an inflation film of which the mechanical properties such as tensile strength, impact strength, etc. and the thickness can be adjusted over wide ranges, to an apparatus therefor, and to an inflation film having excellent properties obtained thereby.

2. Description of the Prior Art

An ultra-high-molecular-weight polyolefin features superior impact strength, abrasion resistance, resistance against chemicals and tensile strength to those of general-purpose polyolefins, and is finding spreading applications as an engineering resin. However, the ultra-high-molecular-weight polyolefin exhibits a very higher melt-viscosity and poorer fluidity than those of the general-purpose polyolefins. Therefore, the ultra-high-molecular-weight polyolefin alone cannot be molded by using a molding machine for general-purpose polyolefins.

Therefore, the present applicant has previously proposed a method of producing a biaxially drawn film by extrusion-molding the ultra-high-molecular-weight polyolefin to which is mixed large amounts of a plasticizer (Japanese Patent Publication No. 16330 /1992). When this method is employed, however, a plasticizer must be extracted from the obtained polyolefin film depending upon the applications.

The present applicant has further proposed a method of producing an inflation film by using a tube die having a mandrel that rotates accompanying the rotation of a screw of an extruder without using a plasticizer (Japanese Patent Publication No. 55433 /1994).

According to this method, however, the tubular film that is extruded is turned sideways, permitting the upper portion to become thin and lower portion to become thick, causing a difference in the thickness between the upper portion and the lower portion. In order to increase the rate of production, furthermore, the rotating speed of the mandrel must be increased accompanying an increase in the rotating speed of the screw giving rise to the occurrence of a problem in that the resin is deteriorated due to friction. In order to erase flight marks of the resin, furthermore, it is required to employ a mandrel of an increased length. There is also a problem that the apparatus becomes large-sized and its installation space becomes wide.

In order to provide optimum inflation films depending upon the applications, furthermore, it becomes necessary to adjust the mechanical properties such as tensile strength and impact strength as well as the thickness of the obtained inflation films over wide ranges.

In view of the above-mentioned technical assignments, the present inventors have conducted study to solve problems, and have found the fact that the mechanical properties such as tensile strength and impact strength, drawing ratio in machine direction and thickness can be adjusted over wide ranges, and an inflation film can be formed permitting the molecular weight to drop less than those of the conventional film-producing methods, by melting a thermoplastic resin in a extruder, by using a screw die having an L/D of at least 5 and having a mandrel which rotates independently of the screw of the extruder, the mandrel rotating at a speed as low as possible, and have confirmed that the inflation film exhibits excellent properties of an ultra-high-molecular-weight polyolefin, and have thus arrived at the present invention.

SUMMARY OF THE INVENTION

The object of the present invention therefore is to provide a method of producing an inflation film capable of adjusting the mechanical properties such as tensile strength and impact strength as well as drawing ratio in a machine direction and thickness of the inflation film over wide ranges, an apparatus therefor, and an inflation film which suppresses the reduction in the molecular weight at the time of molding, exhibits properties of an ultra-high-molecular-weight polyolefin and features uniform thickness.

The present invention was proposed in order to achieve the above-mentioned object, and features the formation of an inflation film by a particular method by using a second screw die having an L/D of at least 5 and having a mandrel which rotates independently of a first screw of an extruder, the mandrel rotating at a speed as low as possible, the obtained inflation film featuring excellent tensile strength and impact strength since a drop in the molecular weight is suppressed during the molding and without unevenness in the thickness.

That is, according to the present invention, there is provided a method of producing an inflation film comprising the steps of melting an ultra-high-molecular-weight polyolefin in an extruder equipped with a first screw, extruding the ultra-high-molecular-weight polyolefin in a molten state from a screw die having an L/D of at least 5 and having a second screw and a mandrel connected thereto, the second screw being permitted to rotate independently of the first screw of the extruder, and blowing a gas into a tubular film of a molten state formed by extrusion.

According to the present invention, furthermore, there is provided a method of producing an inflation film wherein the rotating speeds of the first screw and of the second screw are variable independently of each other, and the rotating speed of the second screw is set to be lower than the rotating speed of the first screw.

According to the present invention, furthermore, there is provided a method of producing an inflation film wherein the ultra-high-molecular-weight polyolefin has an intrinsic viscosity [η] of not smaller than 5 dl/g.

According to the present invention, furthermore, there is provided a method of producing an inflation film wherein the ultra-high-molecular-weight polyolefin is an ultra-high-molecular-weight polyethylene.

According to the present invention, there is provided an apparatus for producing an inflation film comprising an extruder provided with a first screw, and a screw die having an L/D of at least 5 and is provided at the end of the extruder, wherein the screw die comprises a second screw which rotates independently of the first screw, a mandrel coupled to the end of the second screw and rotates together with the second screw, an outer tube die in which the mandrel is inserted, and a gas passage extending within the second screw and in the mandrel.

According to the present invention, furthermore, there is provided an apparatus for producing an inflation film wherein a guide tube is coupled to an end of the mandrel.

According to the present invention, furthermore, there is provided an inflation film comprising an ultra-high-molecular-weight polyolefin having an intrinsic viscosity

[η] of at least 7 dl/g and a thickness of from 10 to 1000 μm, the inflation film further having a tensile strength at break of greater than 1660 kg/cm² in a machine direction and greater than 1600 kg/cm² in a transverse direction, an impact strength of greater than 9500 kg·cm/cm, and an R-value, which is an index of uniformity of the film thickness, of not larger than 10 μm.

According to the present invention, furthermore, there is obtained an inflation film comprising an ultra-high-molecular-weight polyolefin having a tensile strength at break of greater than 1660 kg/cm² in a machine direction and greater than 1600 kg/cm² in a transverse direction, an impact strength of greater than 9500 kg·cm/cm, a thickness of from 10 to 1000 μm, an R-value of not larger than 10 μm and an intrinsic viscosity [η] of at least 7 dl/g, said inflation film being obtained by melting the ultra-high-molecular-weight polyolefin in an extruder, extruding the molten ultra-high-molecular-weight polyolefin from a screw die having an L/D of at least 5 and having a mandrel which rotates independently of the first screw of the extruder, and blowing a gas into the molten tubular film formed by the extrusion to accomplish both an inflation ratio and a drawing ratio in the machine direction which are not smaller than 7.

According to the present invention, furthermore, there is provided an inflation film wherein the ultra-high-molecular-weight polyolefin is an ultra-high-molecular-weight polyethylene.

PREFERRED EMBODIMENTS OF THE INVENTION

Figure 1:
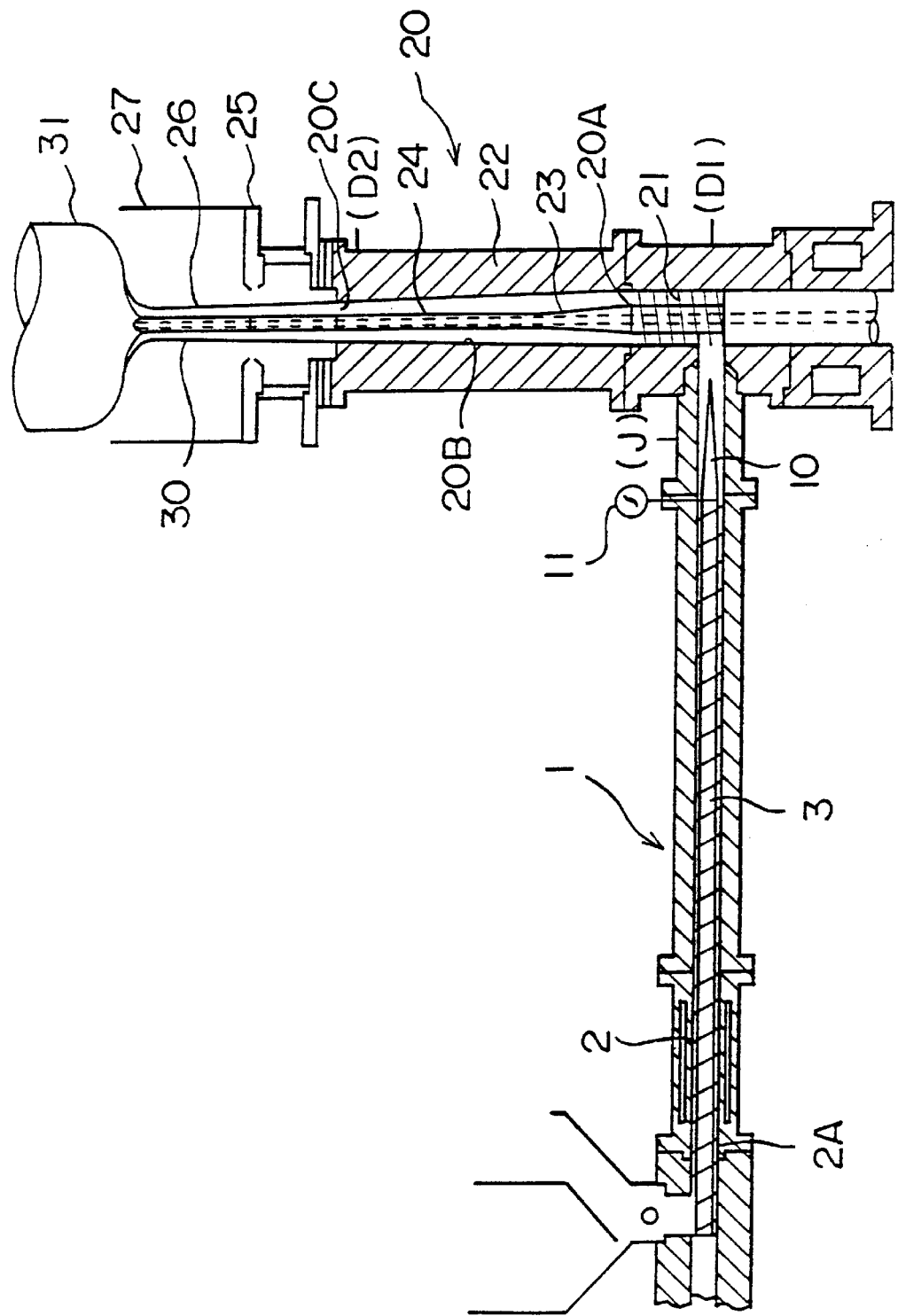
FIG. 1 is a sectional view of an apparatus for producing an inflation film according to the present invention, wherein the reference numeral 1 denotes an extruder, 3 denotes a first screw, 20 denotes a screw die, 21 denotes a second screw, 22 denotes an outer tube die, 23 denotes a mandrel, 24 denotes a gas passage, 26 denotes a guide tube, and 27 denotes a windbreak cylinder.

A first invention of the present invention is concerned with a method of producing an inflation film, wherein a feature resides in that a screw die having an L/D of at least 5 rotates independently of a screw of an extruder to extrude an ultra-high-molecular-weight polyolefin in a molten state.

That is, according to this method of producing an inflation film, the mandrel of the screw die having the second screw rotates independently of the first screw of the extruder. It is therefore allowed to rotate the second screw at a speed lower than the rotating speed of the first screw by increasing the diameter of the screw die and, hence, to prevent the resin from being deteriorated by the heat of friction between the mandrel and the resin.

It is therefore made possible to produce an inflation film enabling the mechanical properties such as tensile strength (in both the machine direction and the transverse direction) and impact strength is well as the drawing ratio in the machine direction and the thickness to be adjusted over wide ranges.

A gas is blown into the tubular film extruded from the screw die, whereby the tubular film inflates and is, then, drawn and cooled simultaneously to obtain a film which is a finished product.

In the present invention, it is important that the ratio of the inner diameter of an outer tube die 22 at a screw die outlet 20C to the length of from an outer die inlet 20A to the screw die outlet 20C, i.e., L/D of the screw die, is not smaller than 5, preferably, is not smaller than 15 and, more preferably, is from 20 to 70. When the screw die has the L/D of not larger than 5, the thermoplastic resin is not completely uniformly melted before it is extruded from the die. When the air is blown into the tubular film that is extruded from the die, therefore, the tube is often nonuniformly inflated or is broken, making it difficult to obtain a good film. Though there is no particular upper limitation, it is desired that the upper limit of L/D is not larger than 70 from the practical point of view. The ratio L/D of the screw die has a relationship to the productivity, and a forming speed can be increased with an increase in the L/D.

Though the air is usually blown into the tubular film, nitrogen may be blown, too. When a gas is to be blown into the tubular film of a molten state, it is desired that the inflation ratio is not smaller than 7, preferably, from 7 to 20 and, particularly, from 8 to 12.

When the inflation ratio is smaller than 7, the thickness tends to become nonuniform in the transverse direction (TD). Besides, since the crystalline orientation is small in the transverse direction becomes difficult to improve mechanical properties such as tensile strength and impact strength. When the inflation ratio exceeds 20, on the other hand, the film becomes turbid appearing white and tends to be ruptured.

In the present invention, it is desired that the drawing ratio in the machine direction is not smaller than 7, preferably, from 7 to 40 and, particularly, from 8 to 30.

When the drawing ratio in the machine direction is not larger than 7, the balloon (inflation tube) tends to swing and, as a result, the thickness becomes nonuniform in the machine direction (MD) and in the transverse direction (TD) exhibiting a great fluctuation in the mechanical properties. When the drawing ratio in the machine direction exceeds 40, on the other hand, the film tends to be ruptured.

In the present invention, the inflation ratio stands for a ratio of the circumferential length of the tube of before being inflated at the screw die outlet (practically, calculated as the inner diameter of the outlet of the outer tube die) to the circumferential length of the tube after inflated, and the drawing ratio in the machine direction stands for a ratio of the take-up speed of the pinch roll to the speed (linear velocity) of the resin flowing out from the die.

In the present invention, furthermore, it is desired that the ultra-high-molecular-weight polyolefin is extrusion-molded at a temperature which is usually higher than its melting point but is lower than 370° C. and, preferably, from 160° C. to 350° C. though it may vary depending upon the kind of the ultra-high-molecular-weight polyolefin. When the extrusion-molding temperature is lower than the melting point, the resin tends to be clogged in the die causing the apparatus to be broken.

When the molding is conducted under such temperature conditions that the temperature of the extruder is from 230° C. to 350° C., that the temperature at the inlet portion to the intermediate portion of the screw die is from 190° C. to 230° C., and that the temperature at the intermediate portion to the outlet portion of the screw die is from 180° C. to 160° C., then, no land-melt fracture occurs in the screw die, which is desirable.

The inflated film is cooled over its outer portion by the air that is uniformly blown from an air ring equipped with a blower, or is cooled by a cooling ring of the water-cooled type or the air-cooled type that comes into intimate contact with the film. The film after cooled is gradually folded by a customary manner, i.e., by a stabilizer board, and is turned into a flat film consisting of two pieces by the pinch roll, and is taken up by a product winder.

The film obtained according to the present invention can be heat-set in advance to lower the thermal shrinkage factor to smaller than about 10%.

As the ultra-high-molecular-weight polyolefin, there can be preferably used an ultra-high-molecular-weight polyolefin having an intrinsic viscosity [η] of not smaller than 5 dl/g, preferably, not smaller than 7 dl/g and, more preferably, from 8 to 25 dl/g as measured in a decalin solution at 135° C.

The ultra-high-molecular-weight polyolefin having an intrinsic viscosity of smaller than 5 dl/g fails to exhibit satisfactory mechanical properties such as tensile strength and impact strength. Moreover, because of its low melt viscosity, the molten ultra-high-molecular-weight polyolefin rotates together with the mandrel in the screw die and is twisted. Or, the thickness becomes nonuniform due to deflection of the mandrel, making it difficult to obtain a uniform film. Though there is no particular limitation on the upper limit of the intrinsic viscosity [η], those having an intrinsic viscosity in excess of 25 dl/g exhibit too high melt viscosity and can be extrusion-molded less favorably.

As the ultra-high-molecular-weight polyolefins, ultra-high-molecular-weight polyethylene and ultra-high-molecular-weight polypropylene may be used. However, among the ultra-high-molecular-weight polyolefins, an ultra-high-molecular-weight polyethylene can be favorably used. The ultra-high-molecular-weight polyethylene has a straight-chain molecular structure. Upon drawing, therefore, the inflation film that is molded exhibits further increased strength and elasticity. Desirably, the inflation film of the ultra-high-molecular-weight polyethylene produced according to the present invention exhibits an intrinsic viscosity [η] of not smaller than 7 dl/g and, more preferably, from 8 to 25 dl/g.

The apparatus for producing an inflation film which pertains to a second invention of the present application has a feature in regard to the screw die coupled to the extruder.

That is, the screw die of the present invention has a second screw separately from the first screw, and a mandrel coupled to the end of the second screw rotates together with the second screw. Besides, the first screw of the extruder and the second screw rotates at speeds independent of each other, and the second screw can be rotated at a speed lower than the rotating speed of the first screw. Owing to this constitution, the mechanical properties of the inflation film such as tensile strength, impact strength, drawing ratio in the machine direction and the film thickness can be adjusted over wide ranges.

In the apparatus for producing the inflation film, furthermore, a guide tube is provided at the end of the mandrel in order to prevent the ultra-high-molecular-weight polyolefin of the molten state extruded in the form of a pipe from oscillating in the transverse direction being caused by the pressure of the air blown from the air ring. Therefore, the inflated film features further improved thickness precision. The inflation film produced by using the apparatus of the present invention has a difference (R-value) between a maximum thickness and a minimum thickness in the circumferential direction of film of not larger than 10 μm.

The apparatus for producing the inflation film of the present invention will now be described with reference to the drawing. Referring to FIG. 1, an extruder 1 is equipped with a grooved cylinder 2 and a first screw 3 having a compression ratio of from 1 to 2.5 and, preferably, from 1.3 to 1.8. A torpedo 10 is coupled by screws to an end of the first screw 3. It is desired that the torpedo 10 has a conical shape to prevent the resin from staying at the end of the first screw 3.

A screw die 20 is provided at the end of the torpedo 10, i.e., on the downstream side in a direction in which the molten resin flows in a manner that the axis of the screw die 20 is at right angles with the axis of the torpedo 10. The screw die 20 has a second screw 21 at a position opposed to the torpedo 10. The second screw 21 is rotated by a drive means (not shown) independently of the first screw 3.

The second screw 21 has a hollow outer tube die 22 in which is formed space of nearly a cylindrical shape which gradually contracts toward the upper direction in FIG. 1. A mandrel 23 is inserted in space of the outer tube die 22. The mandrel 23 is secured to an end (upper end) of the second screw 21 and rotates together with the second screw 21.

A gas passage 24 which is shown by a double dotted line is formed in the second screw 21 and in the mandrel 23. The gas passage 24 runs from the lower end of the second screw 21 up to the end of the guide tube 26 passing through a metal shaft.

In the apparatus for producing the inflation film, the ultra-high-molecular-weight polyolefin powder is stably supplied toward the front side of the extruder through a groove 2A of the grooved cylinder 2.

The screw die 20 has an L/D of not smaller than 5, preferably, not smaller than 15 and, more preferably, from 20 to 70. The ratio (S1/S2) of a sectional area S2 of the resin flow passage at an intermediate portion 20B of the screw die to a sectional area S1 of the resin flow passage at an end 20A of the second screw is from 0.5 to 2.0 and, preferably, from 0.8 to 1.5. Furthermore, the ratio (S2/S3) of a sectional area S3 of the resin flow passage at an outlet 20C of the screw die to the sectional area S2 is from 2.0 to 10.0 and, preferably, from 3.0 to 6.0.

There arises no particular problem when the ratio S1/S2 lies within a range of from 0.5 to 2.0. When the ratio S2/S3 becomes smaller than 2.0, however, the molten resin is not completely uniformalized. When the ratio S2/S3 exceeds 10, on the other hand, the resin pressure becomes so great that it becomes difficult to extrusion-mold the tubular film.

Basically as described above, the area of the resin flow passage of the screw die 20 becomes narrow toward the outlet 20C of the screw die. That is, though the screw die is tapered, it is desired that the upper end of the screw die i.e., the upper end portion of the outer tube die 20C; has a constant area of resin flow passage, i.e., remains straight from the standpoint of maintaining a high dimensional precision of the molded articles.

The straight portion usually has an L/D of from about 0.1 to about 0.5.

The apparatus for producing the inflation film of the present invention has a significant feature in the above-mentioned constitution. The apparatus is further equipped, on the downstream side of the screw die 20, with a stabilizer plate for folding and taking up an inflation film 31 having a thickness of from 10 to 1000 μm which is obtained by cooling a pipe-like parison 30 extruded from the screw die 20 by the air ring 25 and by inflating it with a gas such as the air at an inflation ratio of not smaller than 7 through the gas passage 24, a pinch roll, and a take-up device (which are not shown) which have been employed in the conventional inflation film-forming machines.

As required, furthermore, a guide tube 26 is provided at an upper portion of the outer die 22 in a manner of passing through the air ring 25 and a windbreak cylinder 27. The guide tube 26 is constituted by a metal shaft and a pipe-like member loosely fitted to the shaft. The metal shaft is coupled by screws to an end of the mandrel 23. The metal shaft rotates following the rotation of the second screw 21. However, the pipe-like member is loosely fitted to the metal shaft and, hence, the parison 30 is not twisted though it is linearly extruded in contact with the outer surface of the pipe-like member. Preferred materials for the pipe-like members includes fluorine-containing polymers such as polytetrafluoroethylene.

The molten resin extruded from the extruder 1 of the apparatus for producing the inflation film is received by the second screw 21 of the screw die 20. The rotating speed of the second screw 21 has been so set that a pressure of the extruder 1 indicated by a pressure gauge 11 of FIG. 1 lies within a predetermined range. The molten parison extruded from the screw die 20 is taken up at a speed faster than the speed of extrusion. Then, the parison is inflated at a predetermined inflation ratio with a gas released from the end of the guide tube through the gas passage to thereby obtain an inflation film.

The third invention of the present application is concerned with a homogeneous inflation film obtained by the above-mentioned method and apparatus, and having nearly a uniform tensile strength in both the machine direction and the transverse direction, having excellent impact strength without fluctuation in the thickness over the whole film surfaces.

The inflation film of the present invention comprises an ultra-high-molecular-weight polyolefin having an intrinsic viscosity [η] of not smaller than 7 dl/g and, preferably, from 8 to 25 dl/g and a thickness of from 10 to 1000 μm. The inflation film has a tensile strength at break of greater than 1660 kg/cm$^2$ and, preferably, greater than 2000 kg/cm$^2$ in the machine direction, and greater than 1600 kg/cm$^2$ and, preferably, greater than 1700 kg/cm$^2$ in the transverse direction, an impact strength of greater than 9500 kg·cm/cm and, particularly, greater than 9700 kg·cm/cm, and an R-value of not larger than 10 μm.

A typical inflation film comprises an ultra-high-molecular-weight polyolefin having a tensile strength at break of greater than 1660 kg/cm$^2$, preferably, greater than 2000 kg/cm$^2$ and, more preferably, greater than 2400 kg/cm$^2$ in a machine direction (MD) and greater than 1600 kg/cm$^2$ and, preferably, greater than 1700 kg/cm$^2$ in a transverse direction (TD), an impact strength of greater than 9500 kg·cm/cm and, preferably, greater than 9700 kg·cm/cm, a thickness of from 10 to 1000 μm, an R-value of not larger than 10 μm and an intrinsic viscosity [η] of at least 7 dl/g, said inflation film being obtained by melting the ultra-high-molecular-weight polyolefin in an extruder, extruding the molten ultra-high-molecular-weight polyolefin from a screw die having an L/D of at least 5 and having a mandrel which rotates independently of the firm screw of the extruder, and blowing a gas into the molten tubular film formed by the extrusion to accomplish both an inflation ratio and a drawing ratio in the machine direction which are not smaller than 7.

Here, the machine direction (MD) stands for a direction in which the film is taken up, and the transverse direction (TD) stands for a direction at right angles thereto.

The R-value is an index of the uniformity of the film thickness and indicates a difference between a maximum thickness and a minimum thickness measured at 32 points at regular intervals in a transverse direction of the inflation film. The unevenness of thickness in the MD direction of the inflation film is generally a considerably lower value than the R value.

The film is formed as suppressing a drop in the molecular weight during the molding and exhibits highly strong properties of the ultra-high-molecular-weight polyolefin. Besides the inflation film which is a molded product has a difference between a maximum thickness and a minimum thickness of not larger than 10 μm, and is substantially free of fluctuation in the thickness. In this respect, the inflation film of the present invention is radically distinguished over the conventional ultra-high-molecular-weight polyolefin films.

The ultra-high-molecular-weight polyolefin inflation film obtained by the present invention can be used as lining materials such as of silos, hoppers, chutes, etc., separators for electrolytic cells and non-aqueous electrolytic cells such as alkali cells, lithium ion cells, lead storage batteries, nickel-hydrogen cells and nickel-cadmium cells, contraction films for covering rolls, pipes and steel pipes, packaging films for packaging foods, packages, containers, and sporting goods such as helmets, sailboards, gliding surfaces of skis, etc.

Concretely speaking, furthermore, the ultra-high-molecular-weight polyolefin inflation film of the present invention can be used as sliding tapes, thrust washers, gliding sheets, guides, doctor knives, cassette tape liners, slit sheet for cassette tapes, bags withstanding very low temperatures, heat-shrinking films, bags for preservation at low temperatures, tapes for packaging, starting material for obtaining highly strong drawn yarns, films for capacitors, insulating films, polyolefin-coated rubber rolls, packages for goods, packages for blood, split yarns, ropes for climbing, woven fabrics, nonwoven fabrics, drawn tapes, filters for preventing blood platelets from freezing, sail cloths, explosion-preventing sheets, protection cloths against cutting, safety gloves, overlapped cloths, electric cables, tension members, vibration board of speakers, armor plates, radar dome, synthetic papers, printing papers for outdoor exhibits, envelopes for air mail, packaging materials for water-absorbing agents or oxygen-absorbing agent, air-permeable packages, pasteurized and sterilized packaging materials, base fabric for medical treatment, packaging material for medical instruments, sealing/package for water-adjusted articles, separator films, filtering material for filters, carrier of filters, agricultural film such as mulch-film, green film, electret film, construction material such as house wrapping, etc.

EXAMPLES

The invention will now be described by way of Examples.

Example 1

An ultra-high-molecular-weight polyethylene inflation film was prepared by using an apparatus shown in FIG. 1 having the following specifications.

Specifications of the apparatus

Outer diameter of first screw of extruder: 50 mm

Effective length of screw: 1210 mm (L/D=22)

Flight pitch: 30 mm constant

Compression ratio of screw: 1.8

Effective length of screw die erected on the extruder: 1075 mm (L/D=30)

Inner diameter of outer tube die at die outlet: 36 mm

Outer diameter of mandrel at die outlet: 30 mm

S1/S2: 1.16

S2/S3: 3.07

Outer diameter of second screw of screw die: 50 mm

Effective length of second screw: 160 mm (L/D=3.2)

Flight pitch: 30 mm constant

Compression ratio of second screw: 1.0

Outer diameter of guide tube: 26 mm

Length of guide tube: 400 mm

The apparatus is equipped with a gas passage of a diameter of 8 mm extending in the second screw, in the mandrel and in the guide tube, and with a stabilizer plate, a pinch roll and a product take-up device.

Production of an inflation film

An ultra-high-molecular-weight polyethylene inflation film having a folding width of 510 mm and a thickness of 25 μm was stably produced by using a powder of an ultra-high-molecular-weight polyethylene having [η] of 14.0 dl/g, an MFR of not larger than 0.01 g/10 min., a melting point of 136° C. and a bulk density of 0.47 g/cm³, setting the extruder, a joint portion (J), a die base (D1) and a die end (D2) shown in FIG. 1 at temperatures of 280° C., 230° C., 200° C. and 170° C., respectively, rotating the first screw at 15 rpm and the second screw at 5 rpm, blowing the compressed air from the gas passage of a diameter of 8 mm extending in the second screw, in the mandrels and in the guide tube while taking up the parison by the pinch roll at a speed of 5 m/min so that the parison is inflated about 9 times as great as the inner diameter (36 mm) of the outer tube die.

Example 2

An ultra-high-molecular-weight polyethylene inflation film was produced under the conditions of Example 1 but setting the specifications of the apparatus as follows:

Outer diameter of second screw: 60 mm

Effective length of second screw: 190 mm (L/D=3.2)

Flight pitch: 36 mm

Inner diameter of outer tube die at die outlet: 40 mm

Outer diameter of mandrel at die outlet: 30 mm

Effective length of die: 1075 mm (L/D=27)

S1/S2: 1.8

S2/S3: 2.0 and setting the take-up speed to be 1.1 m/min, inflation ratio to be 8.0, folding width to be 503 mm, and thickness to be 100 μm.

Example 3

An ultra-high-molecular-weight polyethylene inflation film was produced under the conditions of Example 1 but setting the specifications of the apparatus as follows:

Rotating speed of first screw: 7.5 rpm

Rotating speed of second screw: 2.5 rpm

Take-up speed: 3.3 m/min

Inflation ratio: 10.0

Folding width: 565 mm

Thickness: 15 μm

Example 4

An ultra-high-molecular-weight polyethylene inflation film was produced under the conditions of Example 3 but setting the specifications of the apparatus as follows:

Take-up speed: 1.72 mm/min

Inflation ratio: 8.0

Folding width: 452 mm

Thickness: 40 μm

Example 5

A film of a thickness of 25 μm was stably produced under the conditions of Example 1 but setting the specifications of the apparatus as follows:

Effective length of screw die erected on the extruder: 250 mm (L/D=7)

Rotating speed of first screw: 5 rpm

Rotating speed of second screw: 1.5 rpm

Speed of pinch roll: 1.74 m/min

Example 6

A film of a thickness of 25 μm was stably produced under the conditions of Example 1 but using a powder of an ultra-high-molecular-weight polyethylene having [η] of 8.1 dl/g, an MFR of 0.01 g/10 min, a melting point of 136° C. and a bulk density of 0.45 g/cm³ and by setting the temperature of the extruder at 240° C.

Comparative Example 1

It was attempted to form a film of a thickness of 25 μm under the conditions of Example 5 but setting the effective length of the screw die erected on the extruder to be 150 (L/D=4.2). However, flight marks of the second screw did not disappear, the parison could not be favorably drawn, and no film could be obtained.

Comparative Example 2

It was attempted to form a film of a thickness of 25 μm under the conditions of Example 1 but setting the inner diameter of the outer tube die to be 46 mm, S1/S2 to be 1.16, and S2/S3 to be 1.0. However, flight marks of the second screw did not disappear, the parison could not be favorably drawn, and no film could be obtained.

Comparative Example 3

It was attempted to form a film of a thickness of 25 μm under the conditions of Example 1 by using a commercially available polyethylene having [η] of 3.2 dl/g, an MFR of 0.03 g/10 min and a density of 0.950 g/cm³. However, the melt viscosity of the resin was so low that the parison rotated being drawn by the rotation of the mandrel and was twisted, making it difficult to stably form the film.

Properties of the above-mentioned films were evaluated in accordance with the methods described below. The results were as shown in Table 1.

(1) The tensile strength (MD: machine direction) and the tensile strength (TD: direction intersecting the machine direction) were those values (TS: kg/cm²) obtained under the following conditions:

Tensile strength testing method and shape of testing piece: JIS K 6781

Distance between the chucks: 86 mm

Pulling speed: 200 mm/min

Temperature: 23° C.

(2) The impact strengths were the values (kg·cm/cm) of breaking strength obtained under the following conditions:

Measuring instrument: Film impact tester manufactured by Toyo Seiki Co.

Capacity: 30 kg·cm

Impact ball surface: one inch in diameter (3) The thickness (μm) of the film was measured under the following conditions:

Measuring instrument:
 Thickness measuring instrument, "Digi-Thickness Tester" amanufactured by Toyo Seiki Co., detecting ability, 1 μm (detecting precision, 2 μm)

Measuring method:
 The film was measured at 32 points at regular intervals in the circumferential direction (TD), an average value thereof was regarded to be a thickness, and a difference between a maximum thickness and a minimum thickness was regarded to be an R-value.

Standard: JIS Z 1702

Pushing rod: 5 mm in diameter

Load: 125 g

Measuring pressure: 0.637 kg/cm$^2$

Temperature: 23° C.

such that the molten tubular film is not twisted though it is in contact with an outer surface of the pipe member and said guide tube is connected to an upper end of the mandrel, and then inflating the molten tubular film by blowing a gas from an upper end of the guide tube.

2. A method of producing an inflation film according to claim 1, wherein the rotation number of the second screw is smaller than that of the first screw.

3. A method of producing an inflation film according to claim 1, wherein the annular resin flow passage within the outer tube die satisfies the following formulae (1) and (2):

$$S1/S2 = 0.5 \text{ to } 2.0 \tag{1}$$

$$S1/S3 = 2.0 \text{ to } 10.0 \tag{2}$$

TABLE 1

|  | Unit | Ex. 1 | Ex. 2 | Ex. 3 | Ex. 4 | Ex. 5 | Ex. 6 | Comp. Ex. 1 | Comp. Ex. 2 | Comp. Ex. 3 |
|---|---|---|---|---|---|---|---|---|---|---|
| Molding conditions |  |  |  |  |  |  |  |  |  |  |
| Polyethylene intrinsic viscosity [η] | dl/g | 14.0 | 14.0 | 14.0 | 14.0 | 14.0 | 8.1 | 14.0 | 14.0 | 3.2 |
| Effective length of die | mm | 1075 | 1075 | 1075 | 1075 | 250 | 1075 | 150 | 1075 | 1075 |
| Inner diameter of outer tube die | mmφ | 36 | 40 | 36 | 36 | 36 | 36 | 36 | 46 | 36 |
| Outer diameter of end of mandrel | mmφ | 30 | 30 | 30 | 30 | 30 | 30 | 30 | 30 | 30 |
| S1/S2 | — | 1.16 | 1.8 | 1.16 | 1.16 | 1.16 | 1.16 | 1.16 | 1.16 | 1.16 |
| S2/S3 | — | 3.07 | 2.0 | 3.07 | 3.07 | 3.07 | 3.07 | 3.07 | 1.0 | 3.07 |
| Rotating speed of 1st screw | rpm | 15 | 15 | 7.5 | 7.5 | 5.0 | 15 | 5.0 | 15 | 15 |
| Rotating speed of 2nd screw | m/min | 5 | 5 | 2.5 | 2.5 | 1.5 | 5 | 1.5 | 5 | 5 |
| Take-up speed of pinch roll | m/min | 5.0 | 1.1 | 3.3 | 1.72 | 1.74 | 5.0 | 1.75 | 5.0 | 5.0 |
| Items measured |  |  |  |  |  |  |  |  |  |  |
| Inflation ratio | times | 9.0 | 8.0 | 10 | 8.0 | 9.0 | 9.0 | molding impossible |  |  |
| Drawing ratio (MD) | times | 13.3 | 6.3 | 20.0 | 9.4 | 13.3 | 13.3 | molding impossible |  |  |
| Thickness (Ave. Value) | μm | 25 | 100 | 15 | 40 | 25 | 25 | molding impossible |  |  |
| R-value | μm | 4 | 10 | 3 | 4 | 7 | 6 | molding impossible |  |  |
| [η] of film | dl/g | 8.6 | 9.0 | 8.0 | 8.4 | 8.4 | 6.2 | molding impossible |  |  |
| Tensile strength (MD) | kg/cm$^2$ | 2700 | 1600 | 3100 | 2400 | 2500 | 1050 | molding impossible |  |  |
| Tensile strength (TD) | kg/cm$^2$ | 2100 | 980 | 3150 | 1700 | 1950 | 750 | molding impossible |  |  |
| Impact strength | kg · cm/cm | 11500 | 8800 | 15300 | 9900 | 9700 | 7300 | molding impossible |  |  |

(Ex. : Example, Comp. Ex.: Comparative Example)

We claim:

1. A method of producing an inflation film comprising the steps of
 melt-extruding an ultra-high-molecular-weight polyolefin having an intrinsic viscosity (η) of at least 5 dl/g, by means of an extruder provided with a first screw, into a die base provided with a second screw,
 extruding the polyolefin melt within the die base by means of the second screw into an outer tube die which has an L/D of at least 5 and is provided at an upper end of the die base,
 upwardly extruding the polyolefin melt within the outer tube die as a molten tubular film through an annular resin flow passage formed between an outer surface of a mandrel, which is provided on an upper end of the second screw and is rotating together with the second screw, and an inner surface of the outer tube die,
 upwardly taking up the molten tubular film extruded from the outer tube die while contacting the film internally with a guide tube, said guide tube having a shaft rotatably coupled to the mandrel, and a pipe member, wherein said pipe member is loosely fitted to the shaft wherein S1 is a cross-sectional area of the resin flow passage at an inlet of the outer tube die,
 S2 is a cross-sectional area of the resin flow passage at an intermediate portion of the outer tube die, and
 S3 is a cross-sectional area of the resin flow passage at an outlet of the outer tube die.

4. A method of producing an inflation film according to claim 1, wherein the guide tube is connected to the upper end of the mandrel via a metal shaft.

5. A method of producing an inflation film according to claim 1, wherein the ultra-high-molecular-weight polyolefin is an ultra-high-molecular-weight polyethylene.

6. A method of producing an inflation film according to claim 1 wherein the ultra-high-molecular-polyolefin has an intrinsic viscosity (η) of 8 to 25 dl/g.

7. A method of producing an inflation film according to claim 1 wherein the second screw outer tube die has an L/D of 20 to 70.

8. An apparatus for producing an inflation film comprising an extruder provided with a first screw and a vertical screw die which is provided at an end of the extruder and is equipped with a second screw in which resin melt within the extruder is extruded into the screw die by means of the first screw, the extruded resin melt within the screw die is extruded upwardly as an extruded molten tubular film by means of the second screw and the extruded molten tubular film is inflated by a blowing gas, wherein the screw die is provided with a die base having an annular space and is provided with an outer tube die having an L/D of at least 5 and provided on an upper end of the die base, the second screw is arranged within an annular space of the die base, a mandrel which is connected to an upper end of the second screw and rotates together with the second screw passes through an annular space of the outer tube die, a guide tube, said guide tube having a shaft rotatably coupled to the mandrel, and a pipe member, wherein said pipe member is loosely fitted to the shaft such that the molten tubular film is not twisted though it is in contact with an outer surface of the pipe member and said guide tube is connected to an upper end of the mandrel, a gas passage extending from a lower end of the second screw to an upper end of the guide tube through the mandrel, such that a molten tubular film extruded from an annular resin flow passage formed between an inner surface of the outer tube die and an outer surface of the mandrel is taken up while contacting with an outer surface of the guide tube, and the tubular film is then inflated by blowing a gas from the upper end of the guide tube.

9. An apparatus for producing an inflation film according to claim 8, wherein the second screw outer tube die has an L/D of 20 to 70.

10. An apparatus for producing an inflation film according to claim 8, wherein the guide tube is connected to the upper end of the mandrel via a metal shaft.

11. An apparatus for producing an inflation film according to claim 8, wherein the annular resin flow passage within the outer tube die satisfies the following formulae (1) and (2):

$$S1/S2 = 0.5 \text{ to } 2.0 \qquad (1)$$

$$S1/S3 = 2.0 \text{ to } 10.0 \qquad (2)$$

wherein $S1$ is a cross-sectional area of the resin flow passage at an inlet of the outer tube die, $S2$ is a cross-sectional area of the resin flow passage at an intermediate portion of the outer tube die, and $S3$ is a cross-sectional area of the resin flow passage at an outlet of the outer tube die.

* * * * *